United States Patent [19]

Broockman et al.

[11] Patent Number: 4,800,256
[45] Date of Patent: Jan. 24, 1989

[54] HALOGRAPHIC SCANNER HAVING ADJUSTABLE SAMPLING RATE

[75] Inventors: Eric C. Broockman; Robert T. Cato, both of Raleigh; William D. Gregory, Jr., Cary; George J. Laurer, Wendell, all of N.C.

[73] Assignee: International Business Machines Corporation, Armonk, N.Y.

[21] Appl. No.: 938,930

[22] Filed: Dec. 8, 1986

[51] Int. Cl.⁴ .............................................. G06K 7/10
[52] U.S. Cl. .................................... 235/467; 235/457
[58] Field of Search ................................ 235/467, 457

[56] References Cited

U.S. PATENT DOCUMENTS

| 4,097,729 | 6/1978 | Seligman | 235/467 |
| 4,282,431 | 8/1981 | Anthony | 235/467 |
| 4,505,537 | 3/1985 | Funato | 235/457 |
| 4,548,463 | 10/1985 | Cato | 235/457 |
| 4,692,603 | 9/1987 | Brass | 235/467 |

Primary Examiner—Harold I. Pitts
Attorney, Agent, or Firm—Gerald R. Woods

[57] ABSTRACT

An improved holographic scanner includes circuitry for adjusting the frequency with which an analog photodetector signal is sampled in accordance with the focal length of the scanning beam produced by the active holographic facet. Two embodiments are shown. In one embodiment, facet-edge signals are used to track the facets. A processor retrieves a predetermined frequency scaling factor appropriate for each facet. In the other embodiment, a holographic disk carries an auxiliary data track. The track has timing indicia with spatial frequencies dependent upon the focal length of the adjacent facet. The timing indicia are used to control the output of a voltage controlled oscillator in a circuit including a phase locked loop.

9 Claims, 4 Drawing Sheets

HALOGRAPHIC SCANNER HAVING ADJUSTABLE SAMPLING RATE

TECHNICAL FIELD

This invention relates to optical scanners and more particularly to an optical holographic scanner in which incoming data signals can be sampled at different rates as a function of the properties of the active holographic facet.

BACKGROUND OF THE INVENTION

Fixed position optical scanners are used for a number of different purposes. The most widely known use for such scanners is to detect bar code labels affixed to products sold by supermarkets or retail stores. Additional uses for such scanners include detection of bar codes on parts or packages being transported by conveyors through distribution centers, warehouses or manufacturing facilities.

In supermarkets, the bar code information is used primarily to identify products. Once a product has been identified, the system can retrieve a stored price for use in generating a customer receipt tape. The product information can also be used, secondarily, to track sales of particular items or to control inventory levels. In distribution centers, warehouses and manufacturing facilities, the bar code information is used primarily to control distribution of parts and packages.

Fixed position optical scanners typically include a laser, a beam deflecting component for deflecting the laser beam along different scan lines to produce a scanning pattern, a photodetector for sensing optical energy reflected from an item in the path of a scanning beam and a processor for extracting bar code information from the signals produced by the photodetector. The processor is normally a digital processor while the signals provided by the photodetector are analog. To convert the photodetector signals to a form suitable for use by the processor, fixed position optical scanners include an analog to digital converter for periodically sampling the analog signal and for converting each of the samples to a digital signal. The rate or frequency at which the analog signal is sampled is typically fixed.

Moving mirrors are widely used to deflect the laser beam to form scan patterns. The mirrors may oscillate or rotate to generate a moving scanning beam from a stationary laser beam. An auxiliary condensing lens is normally used in a fixed position optical scanner to focus a scanning beam at a known distance from the beam deflecting element. Most optical scanners have a fixed depth of field or range of distances on either side of the focal point within which a bar code may be successfully read. The frequency with which the analog signal is sampled is established, at least in part, at a level appropriate for the scanner's depth of field.

A relatively recent development in fixed position optical scanners has been the use of a rotating holographic optical element or disk to both deflect and focus a laser beam. A holographic disk usually consists of a transparent glass or plastic disk which supports a ring or annulus of holographic optical elements or facets, each of which occupies a sector of the ring. Each of the sectors may be generated using known off-axis holographic techniques. Depending upon the configuration of light beams used in generating the facet, that facet will deflect an incident laser beam along a specific scanning path while focusing it at a specific distance from the facet surface. By changing the beam configurations used in producing different facets, a holographic disk can be formed in which different scanning beams have different focal lengths. By using some facets to produce scanning beams with shorter focal lengths and other facets to produce scanning beams with longer focal lengths, the range of distances over which at least one scanning beam will be sufficiently focussed to read a bar code label will be greatly increased.

The fact that a set of scanning beams are sufficiently focussed over a greater range of distances does not necessarily guarantee that a bar code will be successfully read over that range of distances. The analog signal produced by the photodetector in a holographic disk scanner must be sampled, digitized and decoded as it is in any other scanner.

Analog to digital converters or other sampling circuits which operate at a given sampling frequency are not well suited for scanners which are expected to read bar codes over a considerable range of distances. Practical beam deflecting devices, including moving mirrors or holographic disks, produce scanning beams which sweep with substantially constant angular velocities independent of the focal length of the beam. The linear velocity of a given beam is, however, a function of both its angular velocity and of the radius from the origin of the beam to the point at which the linear velocity is being measured. For example, if a beam has a constant angular velocity, the linear velocity of a beam measured at a distance 40" from the origin of the beam will be four times as great as the linear velocity of the same beam measured at a distance of 10" from the origin of the beam.

If the frequency with which the analog photodetector signal is sampled remains constant, the linear distance between sample points will be four times as great at a point 40" from the beam deflecting element as it is at a point 10" from a beam deflecting element. For bar code labels which meet minimum acceptable size standards, the sample points for a bar code read at a considerable distance from the scanner may be too far apart to adequately define the bar code pattern.

One possible solution to the problem is to establish a sampling frequency high enough to provide an adequate number of samples for the smallest allowable bar code if read by the scanning beam having the longest focal length. The problem with this approach is that the processor and associated electronic circuitry must be capable of continually processing data delivered at this high sampling frequency. Since the processor usually performs other tasks concurrently with processing of data signals, the use of a constant high sampling frequency for reading bar codes "loads" the processor, reducing its overall efficiency in performance of other tasks.

Another solution is simply to limit the minimum and maximum acceptable reading distances to those in which a fixed sampling rate would adequately define a bar code label without being so high as to "load" the processor. Such a solution is clearly impractical since it runs counter to one of the primary reasons for using a holographic disk to begin with; namely, to achieve scanning of bar codes detected over a considerable range of distances from the disk.

SUMMARY OF THE INVENTION

The present invention is an improvement in the type of optical scanner intended to read bar codes over a considerable range of distances. The invention is used in the type of optical scanner having a coherent light source, a rotating holographic optical element with a plurality of facets for deflecting the light beam along predetermined scan lines, a photosensitive detector for detecting light reflected from an object and a sampling circuit for periodically sampling the samples produced by the detector. The facets in the rotating optical element have the capability of focusing the coherent light beam at different focal lengths. The improvement in the scanner consists of means for varying the sampling frequency as a function of the focal length of the facet currently being employed to generate the scan line.

BRIEF DESCRIPTION OF THE DRAWINGS

While the specification concludes with claims particularly pointing out and distinctly claiming that which is regarded as the present invention, details of preferred embodiments of the present invention may be more readily ascertained from the accompanying drawings wherein:

TECHNICAL DESCRIPTION

Figure 1:
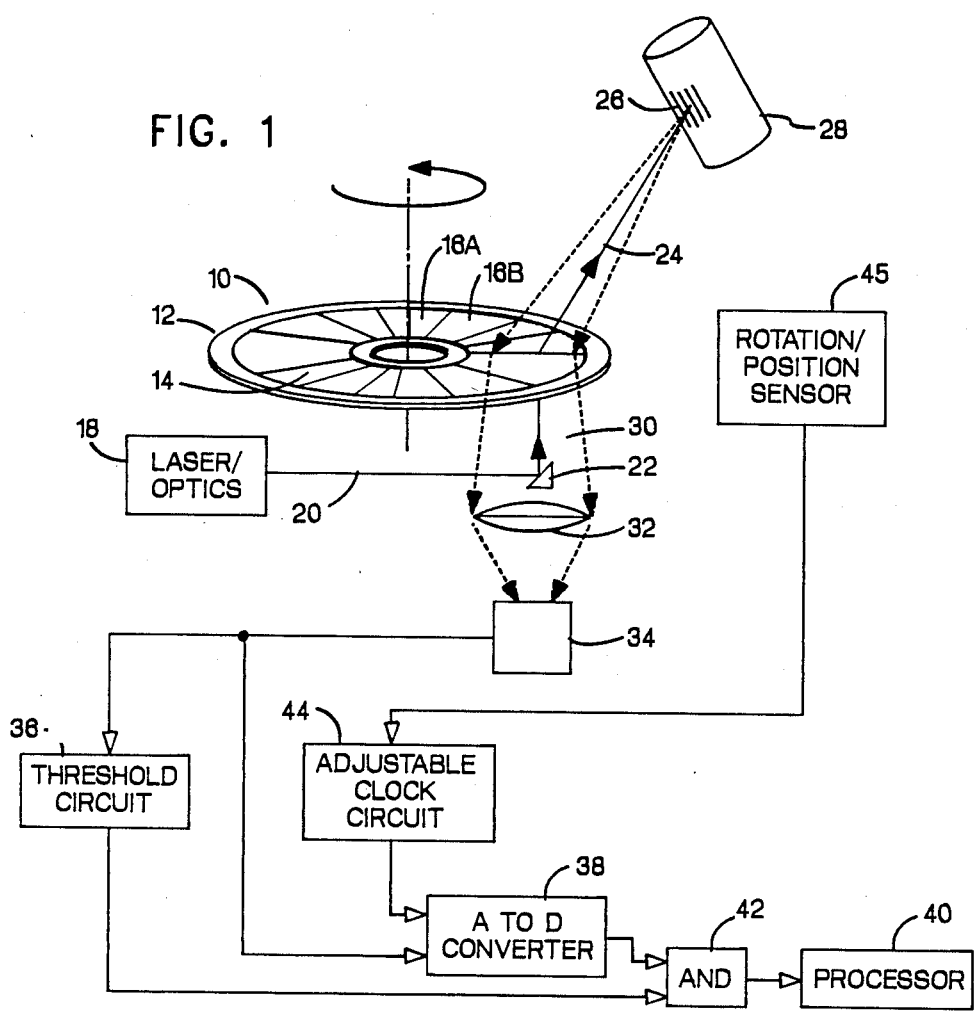
FIG. 1 is a partially schematic diagram of an optical scanner including the present invention.

Referring to FIG. 1, a system into which the present invention may be incorporated includes a beam-deflecting holographic optical element or disk 10 having a transparent glass substrate 12 and an annulus array of holographic facets, such as facets 16A, 16B, etc. The holographic disk 10 is rotated at a nominally constant speed by an electric drive motor (not shown).

The system further includes a laser/optics subsystem 18 which includes a suitable laser device for producing a coherent light beam and optical elements for shaping that beam. The optical elements may include beam expanders and collimating lenses. The details of the laser/optic subsystem are not disclosed as the subsystem is conventional and thus known to those skilled in the art.

An outgoing laser beam 20 is reflected from a small mirror 22 toward the underside of the holographic disk 10. As the disk 10 rotates, the movement of each of the facets 16A, 16B, etc., relative to the beam 20, causes the beam 20 to be deflected through an arc. The facets also focus the deflected or scanning beam at a certain distance in space from the disk surface.

A single outgoing scanning beam 24 is illustrated. In practice, a set of beam folding mirrors (not shown) might be positioned in the path of scanning beam 24. The beam folding mirrors would redirect the beam to produce a multi-directional scan pattern, which would improve the system's ability to read randomly or quasi-randomly oriented bar code labels, such as label 26 carried on the cylindrical container 28.

Light reflected from the bar code label 26 (or anything else in the path of the scanning beam 24) is reflected back along the path of beam 24 to the holographic disk 10. The disk 10 diffracts or bends the returning light along a path 30. Most of the light bypasses mirror 22 and is focussed by a lens 32 onto a photodetector 34. The photodetector 34 converts the returned optical energy to an analog electrical signal having an instantaneous value which varies as a function of the instantaneous reflectivity of the object scanned by the beam 24. The analog signal is applied to a threshold circuit 36 and to an analog to digital converter 38. The function of the analog to digital converter 38 is to periodically sample the analog electrical signals and to convert those samples to digital values which can be more easily processed in a processor 40. If the analog provided by photodetector 34 meets certain minimum levels, as determined by a threshold circuit 36, circuit 36 partially enables an AND gate 42 which passes the digitized output of analog to digital converter 38 to the processor 40.

Conventionally, the rate or frequency at which the analog signal is sampled by the analog to digital converter 38 is fixed. In accordance with the present invention, however, the sampling frequency is adjusted by an adjustable clock circuit 44 having an input from a rotation/position sensor 45. The rotation/position sensor 45, different embodiments of which will be described, provides a signal which can be used to identify the facet currently being used to generate a scanning beam 24. The information provided by sensor 45 can be used to adjust the sampling frequency for the A to D converter 38 as a function of the focal length of the currently active facet. Generally speaking, if two facets have respective focal lengths of 10" and 40" from the surface of the disk 10, the sampling frequency for the second facet will be four times as great as the sampling frequency for the first facet.

Figure 2:
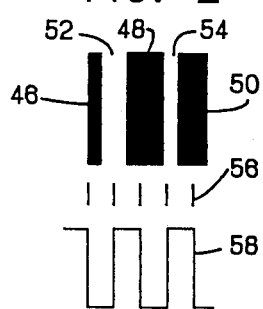
FIG. 2 illustrates a bar code segment along with the waveform which is generated if an analog signal derived from the segment is sampled and digitized to binary values at a given sampling frequency.

The possible consequences of using a fixed sampling frequency to digitize bar codes read over a considerable range of distances is discussed with reference to FIGS. 2 and 3. FIG. 2 shows a bar code segment consisting of three black bars 46, 48 and 50, separated by two intervening white spaces 52 and 54. If the analog signal representing this bar code segment is sampled at the instants indicated by the indicia in a timing track 56, the idealized binary waveform 58 would be produced. The widths of the positive-going pulses in the waveform 58 should ideally correspond to the widths of spaces 52 and 54 while the widths of the negative-going pulses should ideally correspond to the widths of the bars 46, 48 and 50. It will be noted that the three bars have three different widths while the two spaces have two different widths. Due to inadequate sampling frequency, the waveform 58 erroneously indicates bars and spaces in the illustrated segment are the same widths. Obviously, decoding the waveform 58 would yield an erroneous bar code value.

Figure 3:
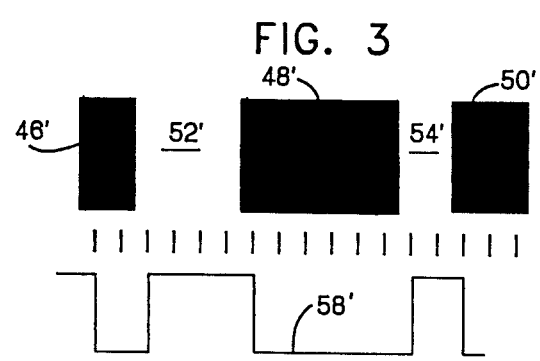
FIG. 3 illustrates the same bar code segment shown in FIG. 2 as it would appear if nearer the scanner along with the waveform which would result if a resulting analog signal is sampled and digitized at the same given sampling frequency.

FIG. 3 illustrates a bar code segment which is an enlarged version of the code segment shown in FIG. 2. Each of the bars and spaces 46', 48', 50, 50', 52' and 54' in FIG. 3 is basically four times as wide as the corresponding bar or space in FIG. 2. If the bar code segment illustrated in FIG. 3 is sampled at a rate indicated by the indicia in timing track 56, the resulting waveform 58' will include negative-going pulses having widths which actually do correspond to the widths of the bars 46', 48' and 50' and positive-going pulses which actually correspond to the widths of the spaces 52' and 54'. Assuming no other errors occur in the decoding process, decoding of the waveform 58' would produce a correct bar code value.

The bar code segment shown in FIG. 2 represents a bar code as it would be seen by a scanner at a given distance. At that given distance, the label can most effectively be scanned by a scanning beam having a long focal length. FIG. 3, on the other hand, represents the same code segment seen at a distance much closer to the scanner. The code segment shown in FIG. 3 can most effectively be scanned by a scanning beam having a shorter focal length.

Figure 4:
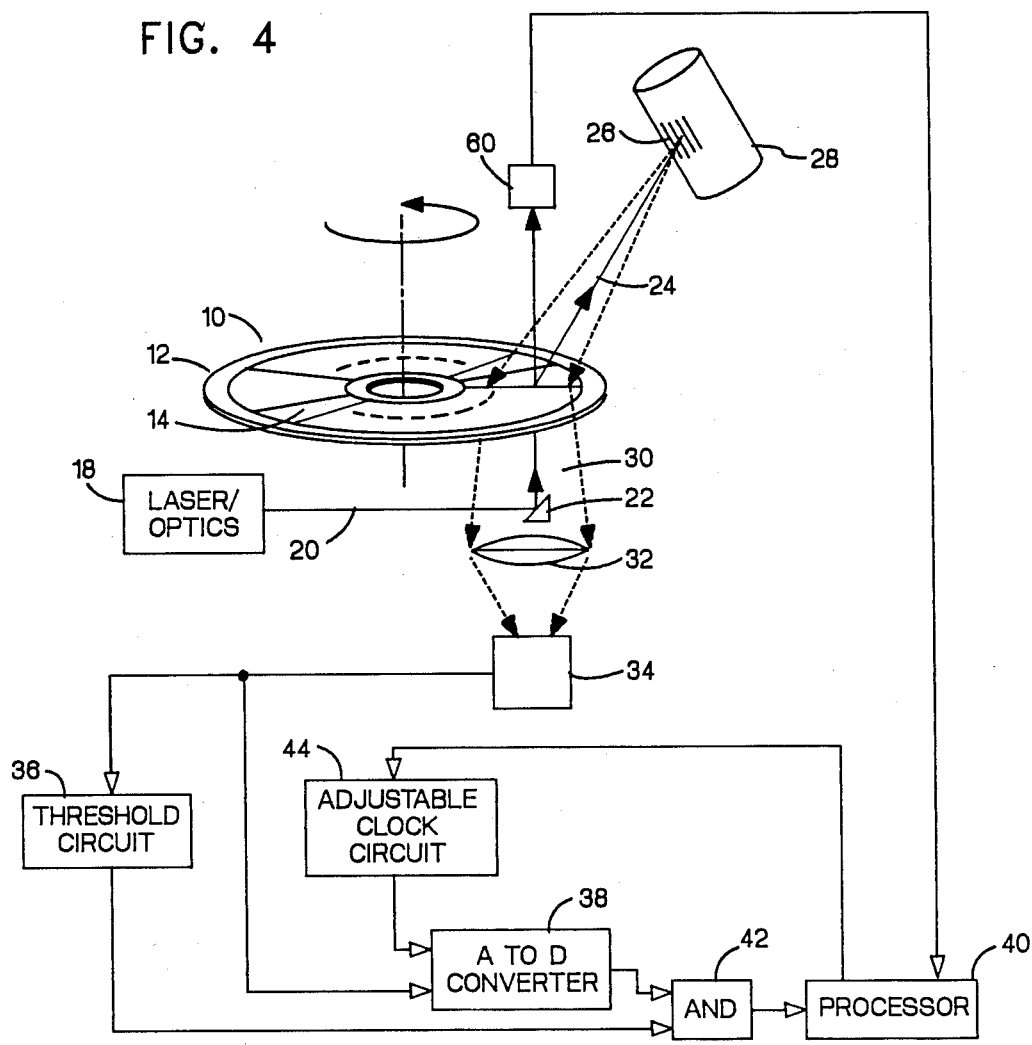
FIG. 4 is a partially schematic diagram of a preferred embodiment of the present invention.

The present invention adjusts the sampling frequency at any given time as a function of the focal length of the holographic facet being used to generate the current active scan line. One embodiment of the invention is shown in FIG. 4. Many of the elements in this embodiment are functionally identical to corresponding elements shown in FIG. 1. Where the functional identity exists, the same reference numerals used in FIG. 1 have been repeated in FIG. 4.

FIG. 4 differs from FIG. 1 in showing certain details of the system actually employed to adjust the sampling frequency as a function of holographic facet focal length.

What had been referred to generically as a rotation/position sensor with reference to FIG. 1 can be seen in FIG. 4 to include a photodetector 60 which receives the zero-order beam; i.e., that portion of the outgoing beam 20 which is not deflected by the individual facets on the holographic disk 10. The amount of optical energy incident on photodetector 60 changes sharply at the edges of adjoining facets, providing facet-edge signals which are applied to processor 40. Processor 40 tracks the currently active facet. When a facet-edge signal is received, the processor determines the next facet which will become active and sends a control signal to the sampling rate control circuit 44 to adjust the sampling frequency as a function of the focal length of that facet.

Figure 5:
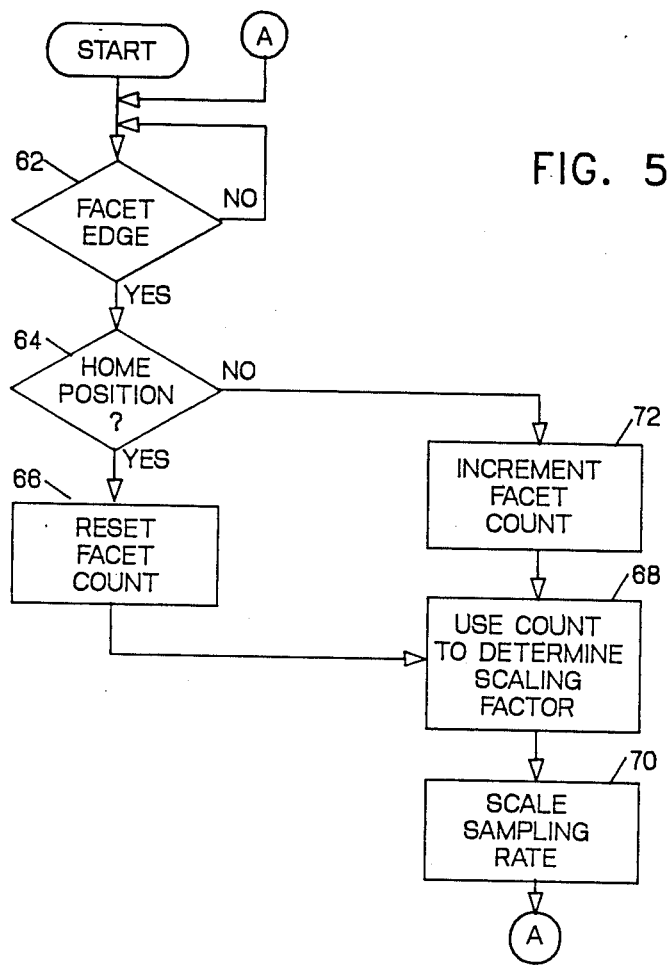
FIG. 5 is a simplified flow chart describing the steps performed to control the sampling frequency in the system shown in FIG. 4.

A brief flow chart of the steps performed in processor 40 to identify the next active facet is described with reference to FIG. 5. The processor 40 analyzes signals provided by photodetector 60 in a repetitive loop until an operation 62 determines that a facet edge signal has been received. When that happens, processor 40 determines (in operation 64) whether the facet edge signal has occurred at a home position on the disk 10. The home position is a predetermined physical position on the disk at the leading edge of what is identified arbitrarily as the first facet on the disk. If operation 64 indicates that the home position has been detected, a facet counter controlled by processor 40 is reset in an operation 66.

The state of the facet counter identifies the next facet to be used in generating the scanning beam. The count can be used to determine a scaling factor (operation 68) appropriate for the next facet. The scaling factor is a direct function of the focal length of the next facet. When the scaling factor has been determined, the sampling rate or sampling frequency is scaled accordingly to increase the sampling frequency for facets having longer focal lengths or decrease the sampling frequency for facets having shorter focal lengths.

If operation 64 had indicated that the facet edge was not that in the home position, the count in the facet counter would have been incremented in an operation 72 following operation 64. The incremented count would then be used in operation 68 to determine the appropriate scaling factor for the next facet.

Figure 6:
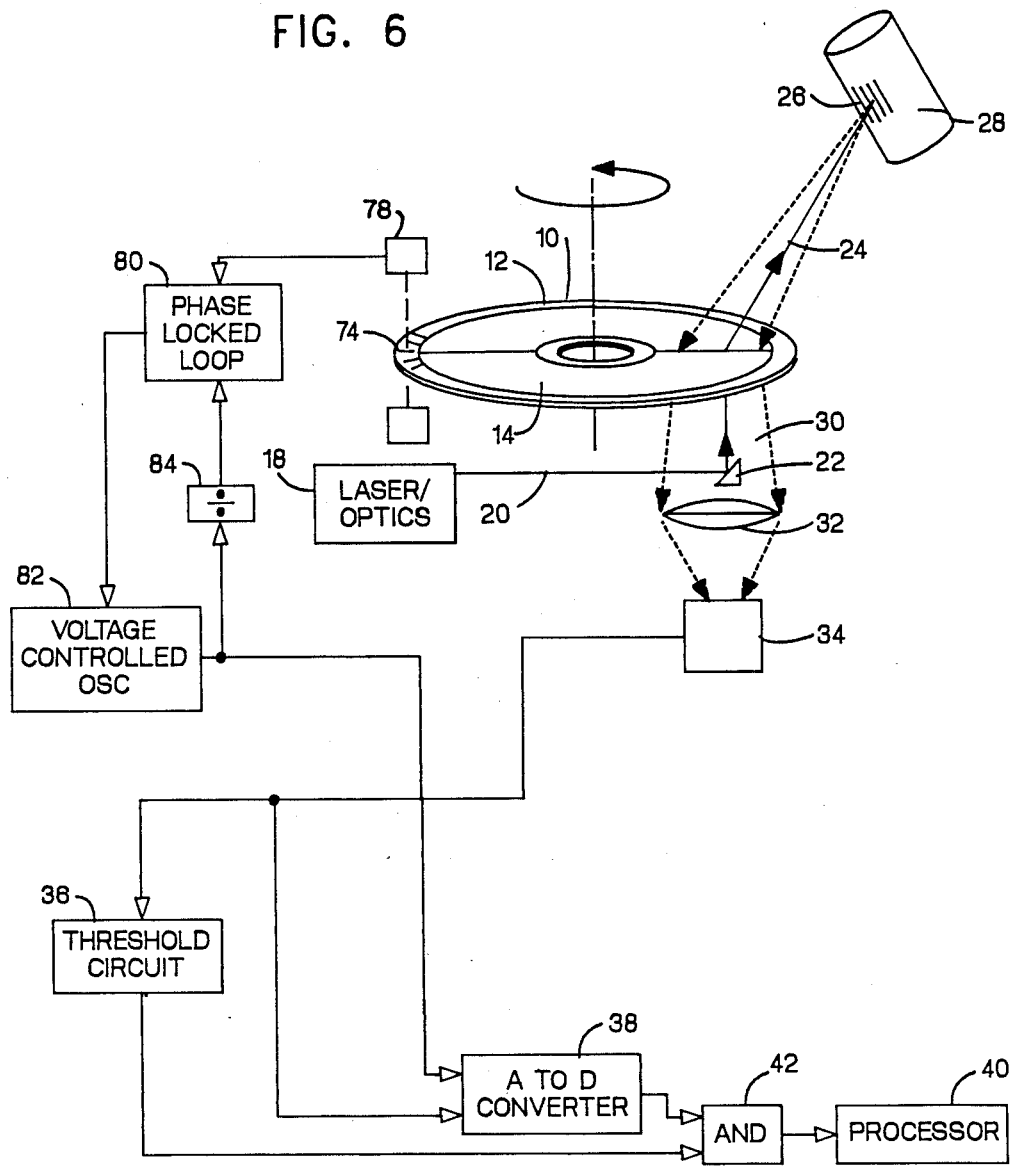
FIG. 6 is a partially schematic diagram of an alternate embodiment of the present invention.

FIG. 6 illustrates an alternative embodiment of the present invention. Certain of the illustrated elements are functionally identical to the ones shown in FIG. 1. The functional identity is indicated by using the same reference numerals to identify those elements in FIG. 6 as were used in FIG. 1.

In the embodiment shown in FIG. 6, signals for controlling the sampling frequency are derived from an auxiliary data track 74 located on the periphery of the disk 10. A light source 76 illuminates the auxiliary data track. Photodetector 78 senses the light from source 76, as modulated by timing marks in the track 74. The modulated signals take the form of a pulse stream which is applied to a phase locked loop 80, the output of which regulates a voltage controlled oscillator 82. The output of the voltage controlled oscillator is applied both to the analog to digital converter 38 and to a divider circuit 84 which provides a second input to the phase locked loop 80. The phase locked loop 80 compares the frequency of signals derived from the auxiliary data track 74 with the divided output from the voltage controlled oscillator 82 and regulates the output of the voltage controlled oscillator to achieve a frequency match between the two input signals.

Figure 7:
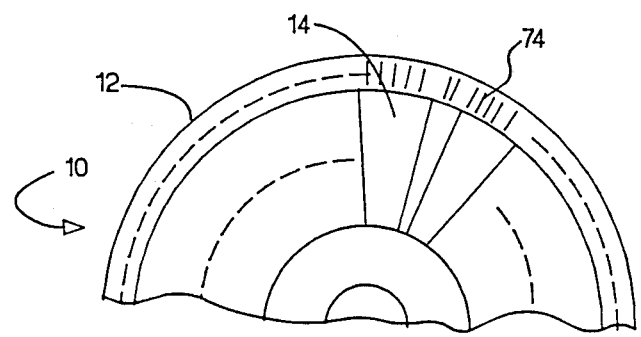
FIG. 7 is a partial plan view of a holographic disk showing timing marks which are employed in the operation of the alternate embodiment represented in FIG. 6.

Referring to FIG. 7, the spatial frequency or angular separation of the marks in timing track 74 is dependent upon the properties of the holographic facet adjacent a particular set of timing marks. If the facet is one having a longer focal length, the marks in timing track 74 are closer together. If the facet has a shorter focal length, the timing marks are further apart. The control circuitry including phase locked loop 80, voltage controlled oscillator 82 and divider circuit 84 acts to establish a sampling frequency dependent upon the spatial frequency of the timing marks. Since the spatial frequency of the timing marks is controlled in accordance with the focal length of the adjacent facet, the end result is a sampling frequency that is a direct function of the focal length of the currently active facet.

While there have been described what are considered to be preferred embodiments of the present invention, variations and modifications in those embodiments will occur to those of skill in the art once they are made aware of the basic concepts of the invention. Therefore, it is intended that the appended claims shall be construed to include not only the preferred embodiments but all such variations and modifications as fall within the true spirit and scope of the invention.

What is claim is:

1. In an optical scanner of the type having a coherent light source, a rotating holographic optical element having a plurality of facets for deflecting the coherent light beam along predetermined scan lines, said facets having the capability of focusing the coherent light beam at different focal lengths from the optical element, a photosensitive detector for detecting light reflected from an object and a sampling circuit for periodically sampling signals produced by the detector, the improvement comprising means for varying the sampling frequency as a function of the focal length of the facet currently being employed to generate a scan line.

2. An optical scanner as defined in claim 1 wherein the sampling frequency is varied in direct proportion to the change in focal length relative to a minimum focal length.

3. An optical scanner as defined in claim 2 wherein said sampling circuit comprises an analog to digital converter and wherein said varying means comprises means for varying the frequency with which an analog signal provided by the detector is sampled and digitized.

4. In an optical scanner of the type having a coherent light source, a rotating holographic optical element having a plurality of facets for deflecting the coherent light beam along predetermined scan lines, said facets having the capability of focusing the coherent light beam at different focal lengths from the optical element, a photosensitive detector for detecting light reflected from an object, a clock circuit, and a sampling circuit for sampling the signal produced by the photosensitive detector with a frequency determined by the output of the clock circuit, the improvement comprising:

means for generating a signal identifying the facet currently used in generating a scan line;

means responsive to the facet-identifying signal for operating on the clock circuit to generate a sampling signal having a frequency related to the focal length of the identified facet.

5. An optical scanner as defined in claim 4 wherein said responsive means changes the frequency of the sampling signal as a function of the focal length of the identified facet relative to a minimum focal length.

6. An optical scanner as defined in claim 5 wherein said sampling circuit includes an analog to digital converter which samples and digitizes the signal produced by the photosensitive detector with a frequency dependent upon the output of the clock circuit.

7. An optical scanner comprising:

a light source for producing a coherent light beam;

a rotating holographic optical element having a plurality of facets for deflecting the coherent light beam along predetermined scan lines and timing indicia on the periphery thereof, the angular spacing of the indicia in a given sector of said ring being a function of the focal length of one of said facets;

means for detecting light reflected from an object in the path of one of the scan lines;

means for producing sampling signals for periodically sampling the signal produced by said detecting means;

means for generating a spatial frequency signal related to the angular spacing of the indicia; and means responsive to the spatial frequency signal for adjusting the frequency of the sampling signals as a function of the spatial frequency.

8. An optical scanner as defined in claim 7 wherein the angular spacing of the indicia is proportional to the focal length of the associated facet.

9. An optical scanner as defined in claim 8 wherein said means for generating a spatial frequency signal comprises a light source located on one side of the holographic optical element and a light detector located on the opposite side of the holographic optical element.

* * * * *